US009536551B2

(12) United States Patent
Tokiwa

(10) Patent No.: US 9,536,551 B2
(45) Date of Patent: Jan. 3, 2017

(54) LASER PROCESSING METHOD AND APPARATUS

(75) Inventor: Tadashi Tokiwa, Kanagawa (JP)

(73) Assignee: NHK SPRING CO., LTD., Kanagawa (JP)

(*) Notice: Subject to any disclaimer, the term of this patent is extended or adjusted under 35 U.S.C. 154(b) by 847 days.

(21) Appl. No.: 13/354,985

(22) Filed: Jan. 20, 2012

(65) Prior Publication Data

US 2012/0219031 A1  Aug. 30, 2012

(30) Foreign Application Priority Data

Feb. 28, 2011  (JP) .................................. 2011-042806

(51) Int. Cl.
| | | |
|---|---|---|
| *B23K 26/00* | (2014.01) | |
| *G11B 5/48* | (2006.01) | |
| *B23K 26/12* | (2014.01) | |
| *B23K 26/22* | (2006.01) | |

(52) U.S. Cl.
CPC ........... *G11B 5/4833* (2013.01); *B23K 26/082* (2015.10); *B23K 26/127* (2013.01); *B23K 26/142* (2015.10); *B23K 26/22* (2013.01)

(58) Field of Classification Search
CPC . B23K 26/125; B23K 26/1405; B23K 26/147; B23K 26/123; B23K 26/127; B23K 26/0807; G11B 5/4833
USPC ...................................................... 219/121.6, 121.63–121.64,219/121.84–121.85
See application file for complete search history.

(56) References Cited

U.S. PATENT DOCUMENTS

| | | | | |
|---|---|---|---|---|
| 3,641,457 A | * | 2/1972 | Brown et al. | 372/58 |
| 3,749,878 A | * | 7/1973 | Sullivan et al. | 219/121.67 |
| 3,875,364 A | * | 4/1975 | Boyett | 219/74 |
| 3,877,334 A | * | 4/1975 | Gerber | 83/22 |
| 3,898,515 A | * | 8/1975 | Andoh et al. | 315/169.2 |
| 4,162,390 A | * | 7/1979 | Kelly | 219/121.63 |
| 5,334,280 A | * | 8/1994 | Anthony et al. | 216/65 |
| 5,736,709 A | * | 4/1998 | Neiheisel | 219/121.61 |
| 5,883,357 A | * | 3/1999 | Newman et al. | 219/121.67 |
| 5,948,172 A | * | 9/1999 | Neiheisel | 134/1 |
| 5,981,897 A | * | 11/1999 | Offer et al. | 219/75 |
| 5,981,901 A | * | 11/1999 | La Rocca | 219/121.63 |
| 6,144,010 A | * | 11/2000 | Tsunemi et al. | 219/121.68 |

(Continued)

FOREIGN PATENT DOCUMENTS

| | | |
|---|---|---|
| JP | 54-60946 | 5/1979 |
| JP | 63-052442 | 3/1988 |

(Continued)

*Primary Examiner* — Dana Ross
*Assistant Examiner* — Joseph Iskra
(74) *Attorney, Agent, or Firm* — Norris McLaughlin & Marcus, P.A.

(57) ABSTRACT

A laser processing method processes spots on an object in a scan area with a laser beam emitted from a laser emitter. The method includes steps of covering the scan area in such a way as to transmit the laser beam and define a closed space over the scan area, jetting an inert gas into the closed space so that the jetted inert gas forms a gas curtain sweeping along the scan area in the closed space, and discharging the inert gas from the closed space while maintaining a positive pressure in the closed space, thereby removing plumes from the spots processed with the laser beam and preventing the spots from oxidizing. The method is capable of stably laser-processing the object without changing the color of the processed spots.

14 Claims, 5 Drawing Sheets

(56) References Cited

U.S. PATENT DOCUMENTS

| | | | |
|---|---|---|---|
| 6,198,792 B1 * | 3/2001 | Kanouff et al. | 378/34 |
| 6,285,000 B1 * | 9/2001 | Gawa et al. | 219/121.7 |
| 6,339,205 B1 | 1/2002 | Nakayama | |
| 6,368,424 B1 * | 4/2002 | Sakai et al. | 148/111 |
| 6,570,899 B1 * | 5/2003 | Yabu et al. | 372/50.1 |
| 6,845,635 B2 * | 1/2005 | Watanabe et al. | 65/30.14 |
| 7,119,984 B2 * | 10/2006 | Macleod et al. | 360/99.18 |
| 7,439,115 B2 * | 10/2008 | Yamazaki et al. | 438/166 |
| 2006/0155413 A1 * | 7/2006 | Yamazaki et al. | 700/121 |
| 2007/0164005 A1 * | 7/2007 | Matsuda et al. | 219/121.61 |
| 2007/0224768 A1 * | 9/2007 | Chaplick et al. | 438/308 |
| 2008/0067160 A1 * | 3/2008 | Suutarinen | 219/121.86 |
| 2010/0108648 A1 * | 5/2010 | Koseki et al. | 219/121.67 |

FOREIGN PATENT DOCUMENTS

| | | |
|---|---|---|
| JP | 3-234390 | 10/1991 |
| JP | 5-200571 | 8/1993 |
| JP | 8-195461 | 7/1996 |
| JP | 8-332586 | 12/1996 |
| JP | 9-001373 | 1/1997 |
| JP | 11-267876 | 10/1999 |
| JP | 2000-214286 | 8/2000 |
| JP | 2001-071170 | 3/2001 |
| JP | 2003-251486 | 9/2003 |
| JP | 2004-154836 | 6/2004 |
| JP | 2004-268080 | 9/2004 |
| JP | 2007-237216 | 9/2007 |
| WO | WO 9316838 A3 * | 9/1993 |

* cited by examiner

LASER PROCESSING METHOD AND APPARATUS

BACKGROUND OF THE INVENTION

1. Field of the Invention

The present invention relates to a laser processing method and a laser processing apparatus for processing very thin plate materials with laser beams.

2. Description of Related Art

Hard disk drives are improving in compactness, capacity and speed. To keep with this, head suspensions installed in the hard disk drives to support read/write elements are required to be compact, deal with high-density disks, operate at high speed, and reduce weight.

Reducing the weight of the head suspensions will be realized by thinning parts of the head suspensions. For this, foil-like materials of 10 to 15 μm thick are frequently used to produce the head suspensions.

In order to join such thin plate materials to each other, laser welding is used. The laser welding must be carried out with stabilized low output power to form nuggets for the thin plate materials. The nugget's diameter is dependent on the thicknesses of plate materials to be welded and is about 100 to 250 μm on the surface of the welded materials.

When laser-welding materials at multiple spots, a related art moves the materials or a laser emitter relative to the other so that a laser beam from the emitter is focused on a welding spot on the materials. Another related art employs a galvano-scanner or a galvano-mirror to focus a laser beam emitted from a laser emitter on a welding spot on the materials to be welded without moving the laser emitter or the materials, thereby speedily welding the materials at multiple spots and improving productivity.

The related arts, however, have a problem of causing plumes during the formation of nuggets, to destabilize the welding operation and fluctuate nugget diameters.

To solve this problem, Japanese Unexamined Patent Application Publication No. H03-234390 ('390 reference) discloses a technique of jetting an inert gas from a nozzle horizontally toward a welding part, to blow plumes out of the welding part.

The technique of the '390 reference is inapplicable to the galvano-scanner that discontinuously scans welding spots one after another at high speed on a material such as a head suspension because the technique is hard to synchronize the movement of the inert-gas-jetting nozzle with the high-speed movement of the galvano-scanner. Namely, it is difficult for the technique of the '390 reference to effectively jet the inert gas horizontally to each welding spot. Accordingly, the related art is incapable of stabilizing nugget diameters.

Japanese Unexamined Patent Application Publication No. 2003-251486 ('486 reference) discloses another technique that blows plumes out of a scan area.

This technique employs the galvano-scanner to guide a pulse laser beam through an fθ lens vertically to a welding spot on an object and accurately form a through hole or a via hole in the object. During the laser processing, the technique of the '486 reference horizontally jets a gas to blow plumes out of an entire scan area of the object that contains multiple spots to be laser-processed one after another.

According to the '486 reference, the scan area is open and the gas jetted to the scan area is drawn with a dust collecting nozzle. This related art gives no consideration on oxidization of the material to be laser-processed. If laser output power is adjustable, the related art may be applicable to welding thin plates instead of forming through holes or via holes in materials. The related art, however, is inapplicable to a product that allows no color change at welded spots, such as a head suspension because the related art has the oxidization problem.

SUMMARY OF THE INVENTION

An object of the present invention is to provide a laser processing method and a laser processing apparatus, capable of stably processing a material without changing the color of the material.

In order to accomplish the object, a first aspect of the present invention provides a laser processing method that processes spots on an object in a scan area with a laser beam emitted from a laser emitter. The method includes steps of covering the scan area with a laser transmissive member to define a closed space on the scan area, jetting an inert gas into the closed space so that the jetted inert gas forms a gas curtain sweeping along the scan area in the closed space, and discharging the inert gas from the closed space while maintaining a positive pressure in the closed space, thereby removing plumes from the spots processed with the laser beam and preventing the spots from oxidizing.

A second aspect of the present invention provides a laser processing apparatus that processes spots on an object in a scan area with a laser beam emitted from a laser emitter. The apparatus includes a laser transmissive chamber covering the scan area to define a closed space on the scan area, a gas feeder jetting an inert gas into the closed space so that the jetted inert gas forms a gas curtain sweeping along the scan area in the closed space, and a discharger discharging the inert gas from the closed space while maintaining a positive pressure in the closed space. The apparatus removes plumes from the spots processed with the laser beam and prevents the spots from oxidizing.

According to the first aspect, the laser processing method jets an inert gas into the closed space so that the jetted inert gas forms a gas curtain sweeping along the scan area in the closed space, to blow plumes out of the spots processed with the laser beam and stabilize the laser processing carried out at the spots. The jetted inert gas fills the closed space on the scan area prevents the laser-processed spots from oxidizing.

According to the second aspect, the laser processing apparatus surely carries out the laser processing method of the first aspect.

BRIEF DESCRIPTION OF THE DRAWINGS

FIGS. 3A to 3C illustrate a valve of the apparatus of FIG. 1, in which FIG. 3A is a side view, FIG. 3B is a front view, and FIG. 3C is a plan view illustrating a jet angle of the valve;

FIGS. 4A to 4C illustrate a modification of the valve, in which FIG. 4A is a side view, FIG. 4B is a front view, and FIG. 4C is a plan view illustrating a jet angle of the valve;

DETAILED DESCRIPTION OF EMBODIMENTS

An embodiment of the present invention will be explained in detail with reference to the drawings. The embodiment jets an inert gas into a curtain shape so that the inert gas forms a gas curtain sweeping along an object in a scan area in a closed space and discharges the inert gas from the closed space while maintaining a positive pressure in the closed space, thereby stably laser-processing the object in the scan area without changing the color of the laser-processed spots of the object.

Figure 1:
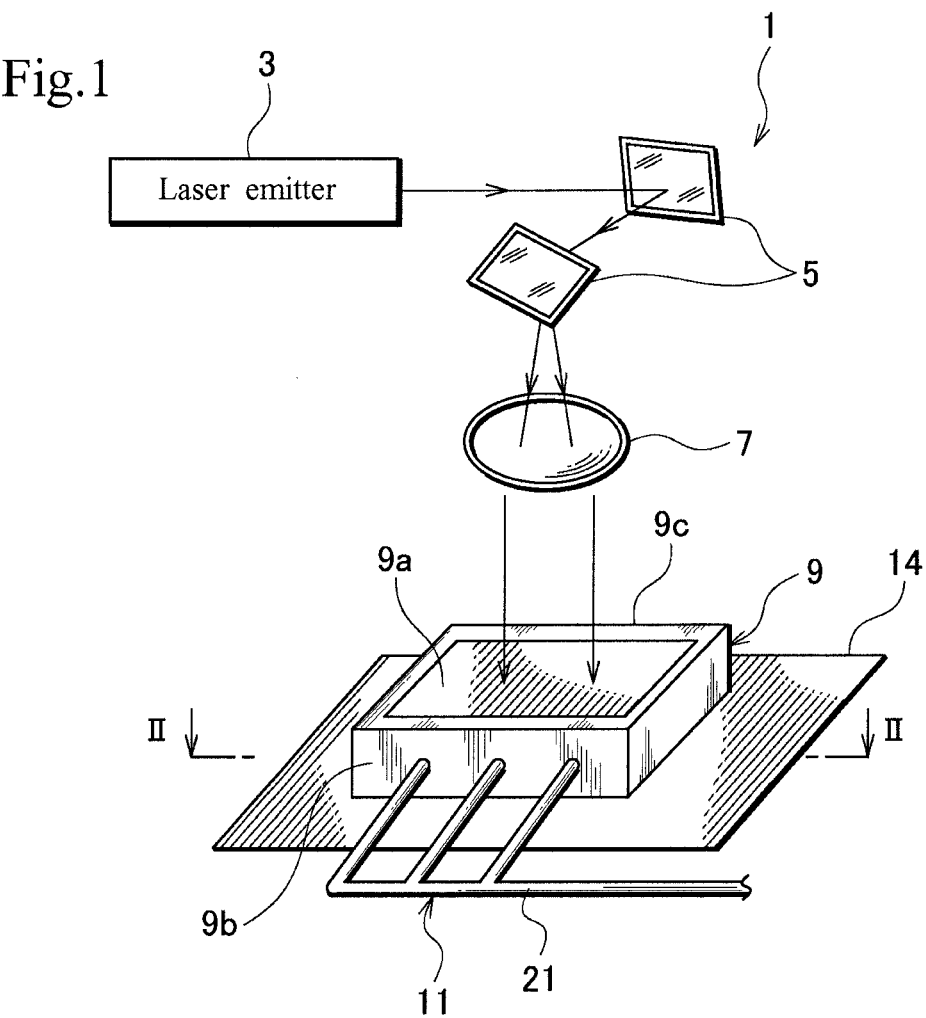
FIG. 1 is a schematic view illustrating a laser processing apparatus according to an embodiment of the present invention.
Figure 2:
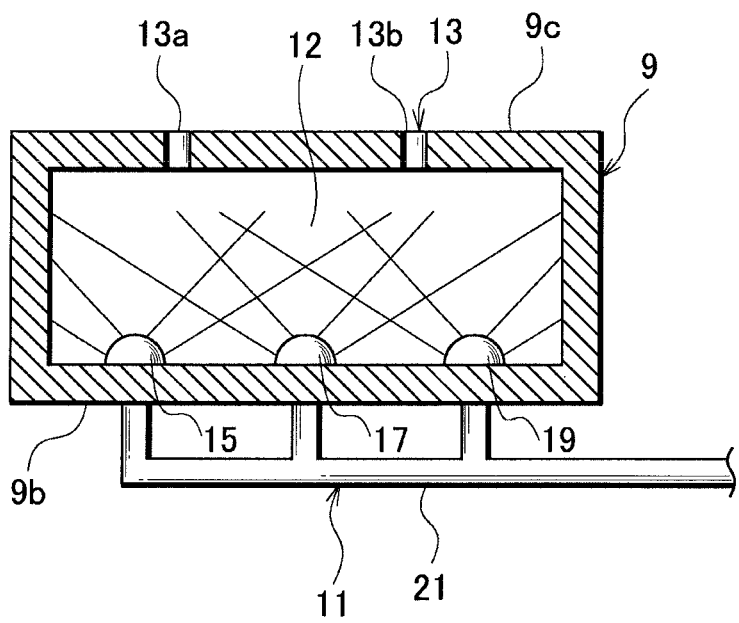
FIG. 2 is a sectional view taken along a line II-II of FIG. 1, illustrating a chamber of the apparatus of FIG. 1.

FIG. 1 is a schematic view illustrating a laser processing apparatus according to an embodiment of the present invention and FIG. 2 is a sectional view taken along a line II-II of FIG. 1, illustrating a chamber of the apparatus of FIG. 1.

The laser processing apparatus 1 includes a laser emitter 3, a galvano-scanner 5, an fθ lens 7, a laser transmissive chamber 9 as a laser transmissive member, a gas feeder 11, and a discharger 13.

Figure 6:
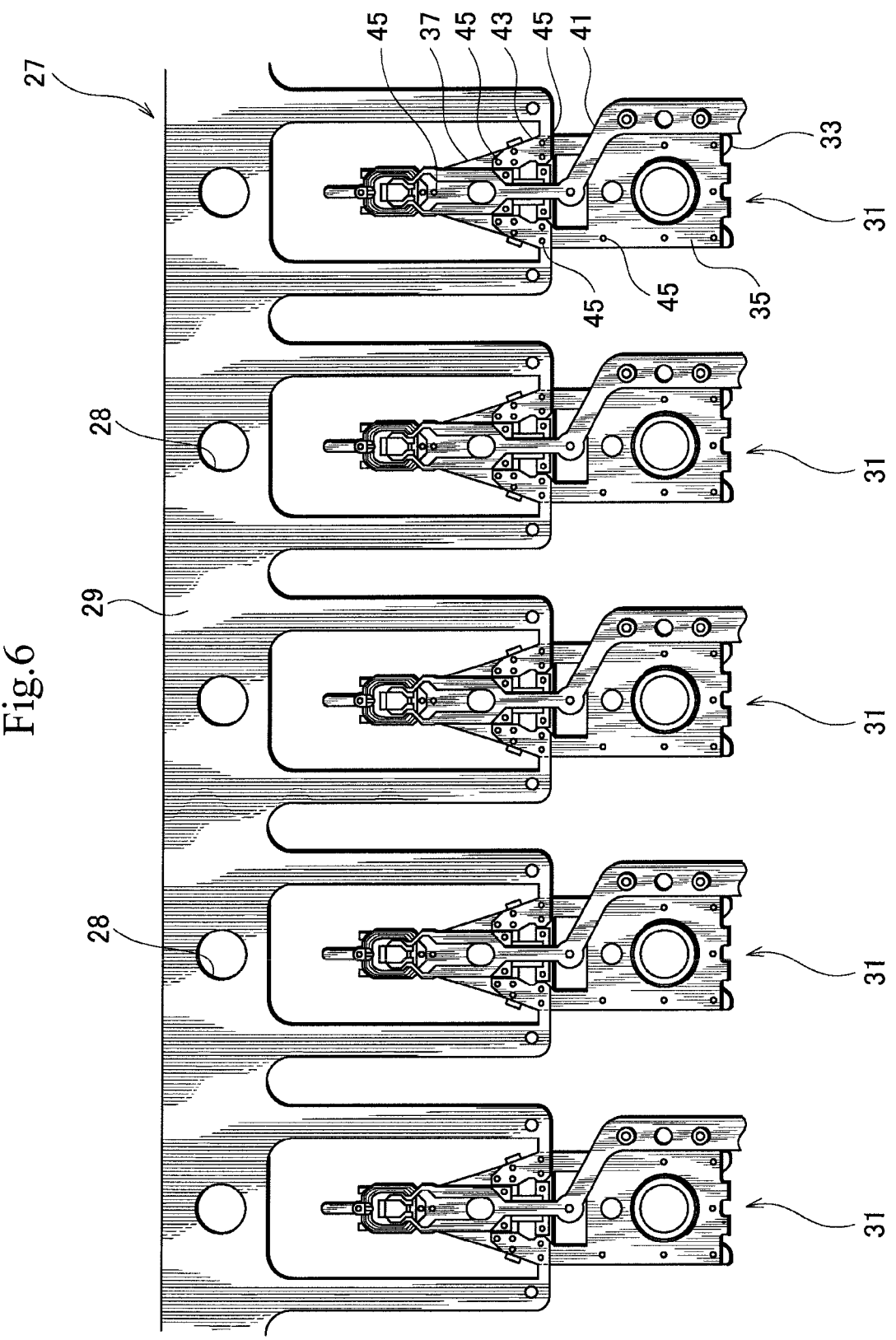
FIG. 6 is a plan view illustrating half-finished head suspensions chained together with a frame.

The laser emitter 3 emits a pulse laser beam, which is guided by the galvano-scanner 5, to scan an object. The laser beam from the galvano-scanner 5 passes through the fθ lens 7 and vertically scans each of plural processing spots on the object in a scan area 12. The object on which the processing spots are present may be head suspensions chained together with a frame (FIG. 6). In this case, the laser processing apparatus 1 spot-welds the processing spots one after another at high speed.

The chamber 9 covers the scan area 12 defined on a support 14 that supports the object to be processed. The chamber 9 defines a closed space on the scan area 12 while allowing a laser beam to penetrating the chamber 9. The scan area 12 faces the closed space.

The chamber 9 has a rectangular box shape with an open bottom. The top of the chamber 9 is provided with a glass plate 9a that opposes the scan area 12 and transmits a laser beam to the scan area 12.

The chamber 9 may have any shape if it transmits a laser beam and defines a closed space on the scan area 12.

At the center of the support 14, there is an opening through which an object to be laser-processed, such as a head suspension is introduced or inserted into the closed space of the chamber 9. The introduced object is fixed at the opening to complete the closed space of the chamber 9 on the scan area 12.

The gas feeder 11 jets an inert gas into the closed space so that the jetted inert gas forms a gas curtain sweeping along the whole scan area 12 in the closed space. The gas feeder 11 has valves 15, 17, and 19 that are supported with a side wall 9b of the chamber 9. The valves 15, 17, and 19 are connected through piping 21 to an inert gas supply source and are arranged horizontally in series to horizontally jet the inert gas in a curtain shape.

The discharger 13 has discharge holes 13a and 13b, to discharge the inert gas jetted into the closed space of the chamber 9 while maintaining a positive pressure in the closed space. The discharge holes 13a and 13b are formed through a side wall 9c of the chamber 9 that opposes the side wall 9b on which the valves 15, 17, and 19 are arranged.

Figure 3A:
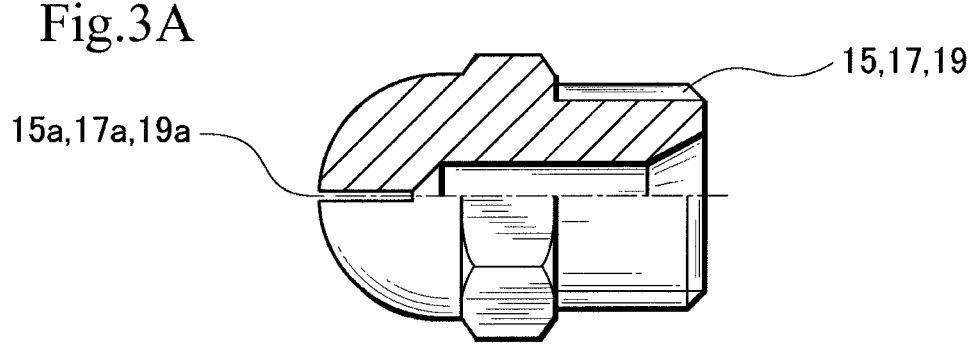
Figure 3B:
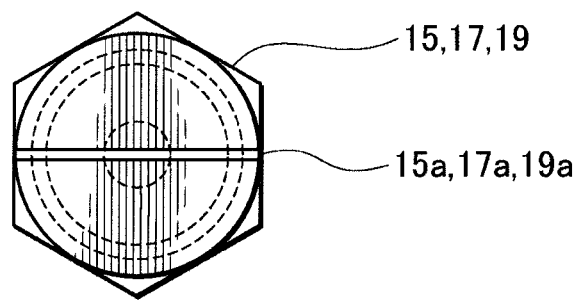
Figure 3C:
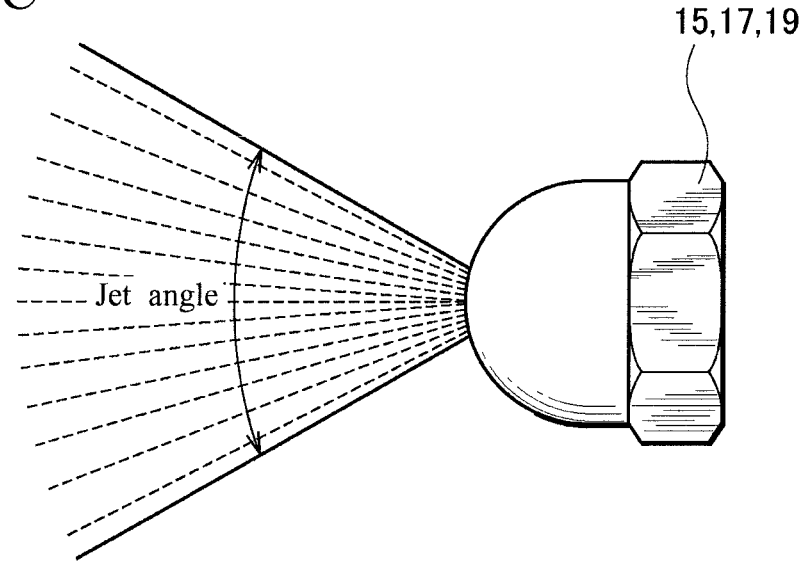

FIGS. 3A to 3C illustrate the valve 15 (17, 19) of FIG. 2, in which FIG. 3A is a side view, FIG. 3B is a front view, and FIG. 3C is a plan view illustrating a jet angle of the valve. The valves 15, 17 and 19 have the same configuration, and therefore, one of the valves is represented in FIGS. 3A to 3C with all numerals of the valves 15, 17 and 19.

The valve 15 (17, 19) has a slit 15a (17a, 19a), to jet a gas to form an individual gas curtain with a plane sector shape or a plane fan shape at a jet angle illustrated in FIG. 3C. The jet angles of the valves 15, 17, and 19 are set so that the individual gas curtains overlap each other as illustrated in FIG. 2, to horizontally jet an inert gas forming substantially a uniform lump gas curtain into the chamber 9.

Figure 4A:
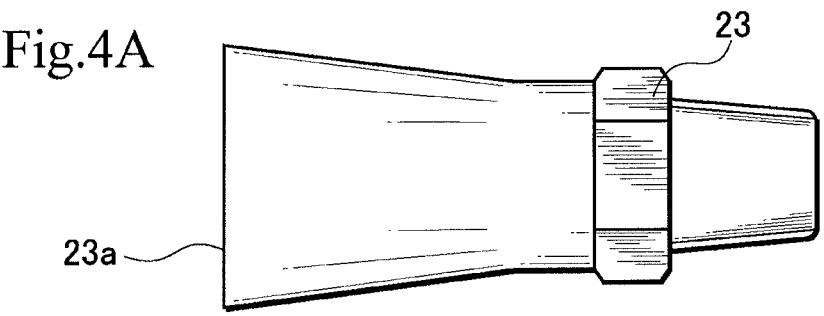
Figure 4B:
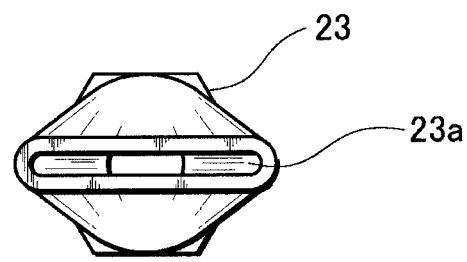
Figure 4C:
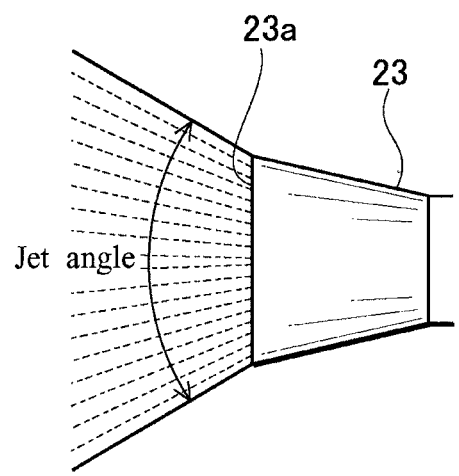

FIGS. 4A to 4C illustrate a modification of the valve, in which FIG. 4A is a side view, FIG. 4B is a front view, and FIG. 4C is a plan view illustrating a jet angle of the valve.

The valve 23 of FIGS. 4A to 4C has a flat nozzle 23a to jet an inert gas to form an individual gas curtain with a plane sector or fan shape at a jet angle illustrated in FIG. 4C.

Figure 5:
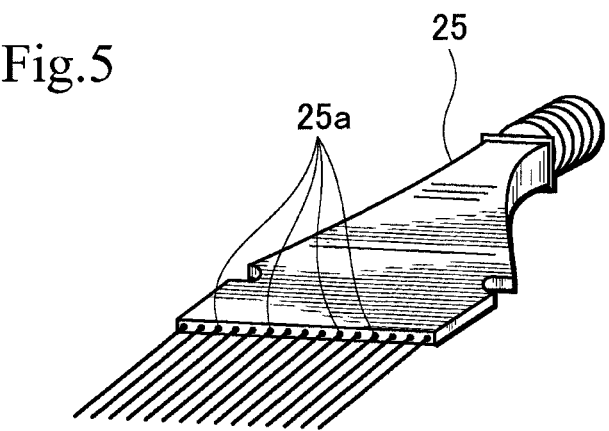
FIG. 5 is a perspective view illustrating another modification of the valve.

FIG. 5 is a perspective view illustrating another modification of the valve 15 (17, 19) and its jetting state.

The valve 25 of FIG. 5 has a plurality of small nozzles 25a arranged horizontally in series, to jet an inert gas to form an individual gas curtain with a plane band shape made of parallel streams from the nozzles 25a.

The valve 23 of FIGS. 4A to 4C or the valve 25 of FIG. 5 is adoptable in place of the valve 15 (17, 19), to horizontally jet an inert gas into a curtain shape.

A laser processing method according to an embodiment of the present invention will be explained. The method is carried out with the laser processing apparatus 1 illustrated in FIG. 1 and is applicable to laser-process an object that is formed by laminating thin plates, such as a head suspension installed in a hard disk drive.

FIG. 6 is a plan view illustrating half-finished head suspensions chained together with a frame.

The half-finished head suspensions 31 are chained together with the frame 29 having positioning holes 28, to form a chain suspension work 27.

Each half-finished head suspension 31 includes a base plate 33 made of, for example, stainless steel, a stiffener 35, a load beam 37, a flexure 41, and a hinge 43 that are joined together by spot welding at spots 45.

The base plate 33 is about 125 to 150 μm thick, the stiffener 35 is about 125 to 150 μm thick, the load beam 37 is about 25 to 100 μm thick, the flexure 39 is about 10 to 15 μm thick, and the hinge 41 is about 20 to 40 μm thick.

Spot welding at the spots 45 is carried out with the laser processing apparatus 1 of FIG. 1 that discontinuously processes the plural spots 45 at high speed. Namely, the laser emitter 3 emits a laser beam, which is guided by the galvano-scanner 5 and is passed through the fθ lens 7, to vertically irradiate a target one of the spots 45 on the half-finished head suspension 31 in the scan area 12 and weld the target spot 45.

At this time, the half-finished head suspension 31 of the chain suspension work 27 is introduced in the opening of the support 14 from below and is fixed at the opening within the scan area 12, to close the opening of the support 14.

The scan area 12 is covered with the chamber 9, to define the closed space on the scan area 12. With the glass plate 9a, the chamber 9 transmits the laser beam from the fθ lens 7 to the target spot 45 on the half-finished head suspension 31.

An inert gas is supplied from the gas supply source through the piping 21 to the valves 15, 17, and 19 and is jetted from the slits 15a, 17a, 19a of the valves 15, 17, and 19 to form a gas curtain with a plane fan or sector shape so that the inert gas in the sector shape sweeps along the scan area 12.

The quantity of the inert gas to be jetted is adjusted according to the size of the closed space and an area of the object (half-finished head suspension) to be processed in the scan area 12.

The inert gas may be a nitrogen gas or an argon gas. The plane curtain shape of the jetted inert gas is formed by a sector or fan shape of each valve illustrated in FIG. 3C. The horizontal curtain shape of the jetted inert gas may be formed by a sector or fan shape of the valve 23 illustrated in FIG. 4C, or by a band shape of parallel streams of the valve 25 illustrated in FIG. 5.

The jetted inert gas is discharged from the discharge holes 13a and 13b of the discharger 13 with a positive pressure being maintained in the closed space of the chamber 9.

The quantity of the discharged inert gas is controlled to be smaller than the quantity of the jetted inert gas. Namely, the quantity of the inert gas discharged through the discharge holes 13a and 13b of the discharger 13 is controlled to be smaller than the quantity of the inert gas supplied through the piping 21. The quantity of the inert gas discharged through the discharge holes 13a and 13b is calculable according to the number and dimensions of the discharge holes 13a and 13b.

Figure 7:
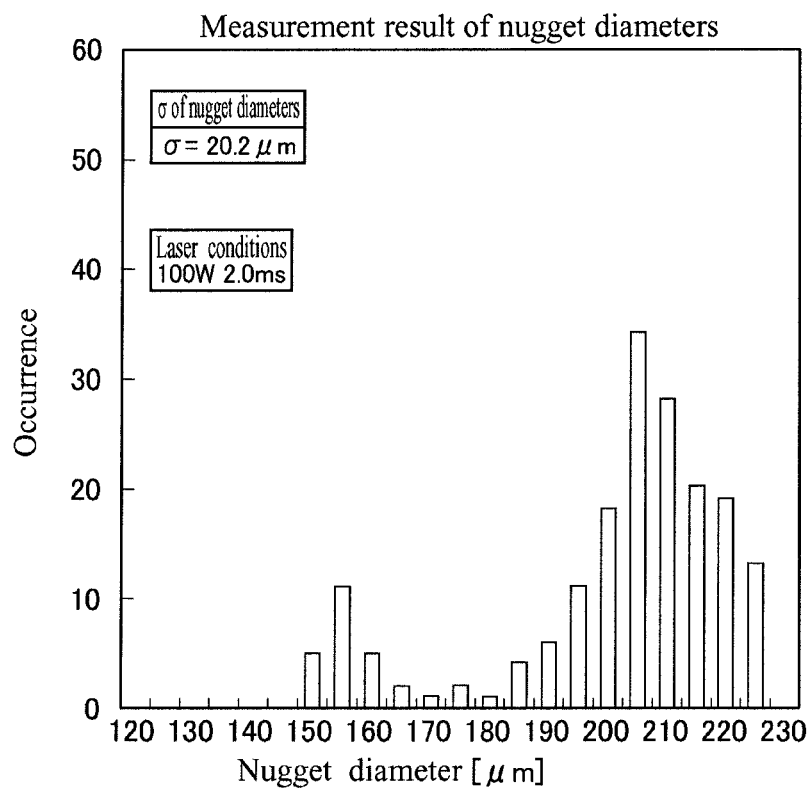
FIG. 7 is a graph illustrating a result of measurement of nugget diameters according to a comparative example.
Figure 8:
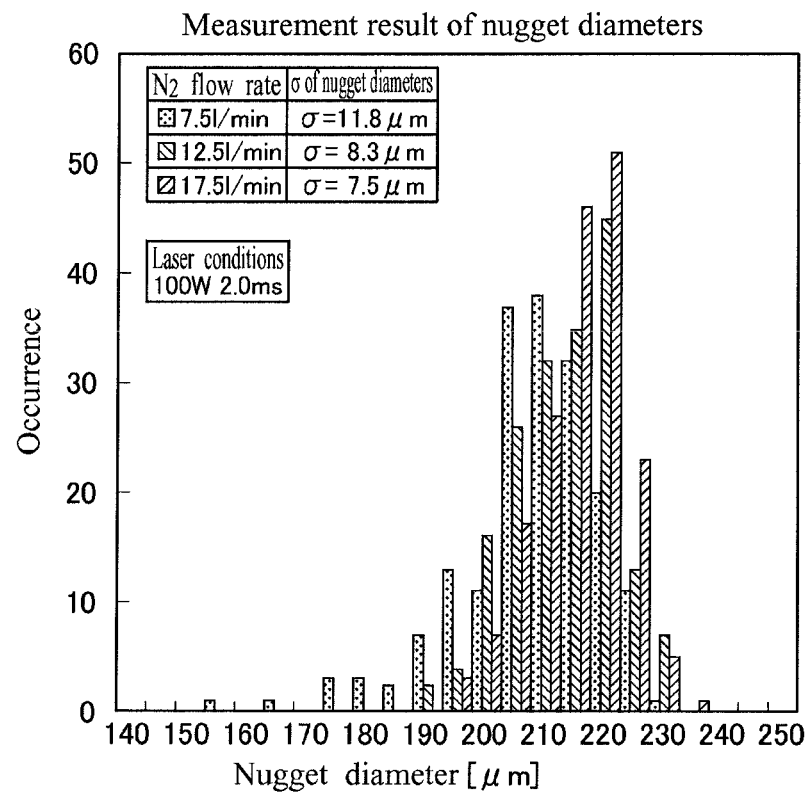
FIG. 8 is a graph illustrating a result of measurement of nugget diameters according to the embodiment of the present invention.

FIG. 7 is a graph illustrating a result of measurement of nugget diameters according to a comparative example and FIG. 8 is a graph illustrating a result of measurement of nugget diameters according to the embodiment of the present invention. In each graph, an abscissa represents a nugget diameter (μm) and an ordinate represents an occurrence rate.

The nugget diameters of the comparative example illustrated in FIG. 7 are obtained from nuggets that are formed on a sample in a closed space, the closed space being defined with a chamber set on a scan area like the embodiment of the present invention and being simply filled with a nitrogen gas. The nugget diameters of the embodiment illustrated in FIG. 8 are obtained from nuggets that are formed on a sample in a closed space, the closed space being defined with the chamber 9 set on a scan area, being swept with a nitrogen gas jetted in a sector shape at a flow rate that is changed among 7.5 litter/min, 12.5 litter/min, and 17.5 litter/min, and being maintained at a positive pressure.

Both the comparative example and embodiment employ a pulse laser beam of 100 W and 2.0 ms when forming the nuggets.

According to the comparative example of FIG. 7, a standard deviation σ of the nugget diameters is 20.2 μm. According to the embodiment of the present invention of FIG. 8, standard deviations σ of the nugget diameters for the respective flow rates are 11.8 μm, 8.3 μm, and 7.5 μm. Each standard deviation of the nugget diameters according to the embodiment is small to indicate that the embodiment is capable of suppressing fluctuations in the nugget diameters.

Effect of the embodiments of the present invention will be explained.

The laser processing method according to the embodiment emits a laser beam from the laser emitter 3, passes the laser beam through the fθ lens 7, and vertically irradiates, with the laser beam, a target spot 45 on the chain suspension work 27 in the scan area 12. The method covers the scan area 12 with the laser transmissive chamber 9 having the glass plate 9a that transmits a laser beam, to form a closed space on the scan area 12. The method supplies a nitrogen gas or an argon gas from a gas supply source through the piping 21 to the gas feeder 11, jets the gas from the valves 15, 17, and 19 in a sector shape or a band shape to sweep along the scan area 12, and discharges the gas through the discharge holes 13a and 13b of the discharger 13 while maintaining a positive pressure in the closed space.

Feeding and discharging the nitrogen or argon gas to and from the scan area 12 results in removing plumes that occur when multiple spots 45 on the chain suspension work 27 in the scan area 12 are successively laser-processed. This results in uniformly and stably forming nuggets at the welded spots 45.

The embodiment is particularly effective when joining very thin plate materials of a head suspension, and therefore, is capable of improving the quality, productivity and production yield of head suspensions with the stably joining.

The fed nitrogen or argon gas fills the closed space on the scan area 12 and prevents the laser-welded spots 45 on the chain suspension work 27 from oxidizing or changing their colors, thereby securing the quality of appearance of the head suspensions.

The embodiment employs the galvano-scanner 5 to guide a laser beam to a target spot in the scan area 12. Accordingly, the embodiment realizes successively laser-processing a plurality of spots 45 on the chain suspension work 27 at high speed.

The embodiment controls the quantity of the nitrogen or argon gas discharged from the discharger 13 to be smaller than the quantity of the nitrogen or argon gas jetted from the gas feeder 11. This secures a positive pressure in the closed space defined by the chamber 9 and surely prevents the oxidization and color change of the laser-processed spots 45.

The embodiment adjusts the quantity of the nitrogen or argon gas supplied from the gas supply source through the piping 21 and jetted from the valves 15, 17, and 19 into the chamber 9 according to the size of the closed space in the chamber 9 and an area to be processed with laser beams. The nitrogen or argon gas is jetted with the adjusted quantity in a plane curtain shape to sweep along the scan area 12, and at the same time, a positive pressure is maintained in the closed space.

The laser processing apparatus 1 according to the embodiment emits a laser beam from the laser emitter 3, passes the laser beam through the fθ lens 7, and vertically irradiates, with the laser beam, a target spot 45 on the chain suspension work 27 in the scan area 12. The apparatus 1 includes the laser transmissive chamber 9 having the glass plate 9a to transmit the laser beam and covering the scan area 12 to define a closed space on the scan area 12, the gas feeder 11 having the valves 15, 17, and 19 jetting a nitrogen gas or an argon gas to form a gas curtain with a plane sector or fan shape or with a plane band shape of parallel streams to sweep along the scan area 12, and the discharger 13 that has the discharge holes 13a and 13b, maintains a positive pressure in the closed space, and discharges the nitrogen or argon gas from the closed space. The nitrogen or argon gas fed into and discharged from the closed space removes plumes from the laser-processed spots 45 and prevents the spots 45 from being oxidized.

The laser processing apparatus 1 is capable of stably forming uniform nuggets at the laser-processed spots 45 and preventing the oxidization and color change of the spots 45.

The glass plate 9a of the chamber 9 opposes the scan area 12, to transmit a laser beam to the scan area 12. With this, the laser processing apparatus 1 is capable of spot-welding the spots 45 with the transmitted laser beam while jetting the nitrogen or argon gas to form a gas curtain to sweep the scan area 12 and maintaining a positive pressure in the closed space in the chamber 9.

Laser processing carried out according to the present invention is not limited to spot welding. The present invention is applicable to any laser processing if it is carried out in the scan area 12 inside the chamber 9. For example, the present invention is applicable to irradiating with laser beams for correcting the attitude of a head suspension, making laser holes or recesses in a material, carrying out continuous laser welding, and the like.

The present invention is also applicable to laser processing carried out with a laser marker.

What is claimed is:

1. A laser processing method of processing spots on an object positioned on a scan area with a laser beam emitted from a laser emitter, the scan area being defined onto a support that supports the object, the method comprising steps of:
    enclosing the scan area with a transmissive member having a box shape to define a closed space on the scan area for accumulating an inert gas;
    jetting in a direction intersecting the laser beam the inert gas into the closed space so that the jetted inert gas forms a gas curtain extending in said direction toward spots of the object processed with the laser beam and passing in said direction over the scan area in the closed space while the gas curtain touches the scan area and the object to blow plumes generated from spots of the object and so that the jetted inert gas is accumulated in the closed space; and
    discharging the inert gas from the closed space in which the jetted inert gas is accumulated while maintaining a positive pressure in the closed space, thereby removing the plumes blown by the gas curtain from the closed space and preventing the spots from oxidizing.

2. The method of claim 1, further comprising a step:
    scanning the spots in the scan area with the laser beam emitted from the laser emitter by a galvano-scanner.

3. The method of claim 1 wherein the spots on the object are discontinuously welded one after another with the laser beam.

4. The method of claim 1 wherein the inert gas is one of a nitrogen gas and an argon gas.

5. The method of claim 1 wherein the inert gas is jetted into one of a plane sector shape and a plane band shape formed of parallel streams.

6. The method of claim 1 wherein the processing spots on an object are laser-welding spots on an object.

7. The method of claim 1 wherein the object is a thin plate material such as a head suspension.

8. The method of claim 1 wherein the quantity of the discharged inert gas is controlled to be smaller than the quantity of the jetted inert gas.

9. The method of claim 1 wherein the quantity of the jetted inert gas is adjusted according to the size of the closed space and an area of the object to be processed in the scan area.

10. A laser processing apparatus for processing spots on an object positioned on a scan area with a laser beam emitted from a laser emitter, the scan area being defined onto a support that supports the object, the apparatus comprising:
    a transmissive chamber having a box shape and enclosing the scan area to define a closed space on the scan area for accumulating an inert gas;
    a gas feeder configured to jet the inert gas in a direction intersecting the laser beam into the closed space so that the jetted inert gas forms a gas curtain extending in said direction toward spots of the object processed with the laser beam and passing in said direction over the scan area in the closed space while the gas curtain touches the scan area and the object to blow plumes generated from spots of the object and so that the jetted inert gas is accumulated in the closed space; and
    a discharger discharging the inert gas from the closed space in which the jetted inert gas is accumulated while maintaining a positive pressure in the closed space, thereby removing the plumes blown by the gas curtain from the closed space and preventing the spots from oxidizing.

11. The apparatus of claim 10 wherein the chamber has a glass plate that opposes the scan area and transmits the laser beam.

12. The apparatus of claim 10 wherein the gas feeder has valves arranged in series on a side wall of the chamber, each of the valves having one of a nozzle with slits, a nozzle with a flat outlet, and a nozzle with small outlets arranged in series.

13. The apparatus of claim 10 wherein the discharger has discharge holes formed in a side wall of the chamber that opposes the side wall on which the valves are arranged.

14. A laser processing method of processing spots on an object positioned on a scan area with a laser beam emitted from a laser emitter, the scan area being defined onto a support that supports the object, the method comprising steps of:
    enclosing the scan area with a transmissive member having a box shape formed by solid walls that include a part with optical transparency to allow the laser beam to penetrate the transmissive member, to define a closed space on the scan area for accumulating an inert gas while the closed space is open through a hole formed through the transmissive member and a gas feeder is brought into the closed space;
    jetting in a direction intersecting the laser beam the inert gas from the gas feeder into the closed space so that the jetted inert gas forms a gas curtain extending in said direction toward spots of the object processed with the laser beam and passing in said direction over the scan area in the closed space while the gas curtain touches the scan area and the object to blow plumes generated from spots of the object and so that the jetted inert gas is accumulated in the closed space; and
    discharging the inert gas from the closed space through the hole through which the closed space is open with a quantity of the discharged inert gas from the hole being smaller than a quantity of the jetted inert gas from the gas feeder, thereby assuring the accumulating of the jetted inert gas and carrying out the discharging of the inert gas while maintaining a positive pressure in the closed space, and thereby removing the plumes blown by the gas curtain from the closed space and preventing the spots from oxidizing.

* * * * *